US008188845B2

(12) United States Patent
Abernethy, Jr. et al.

(10) Patent No.: US 8,188,845 B2
(45) Date of Patent: May 29, 2012

(54) MODIFYING AN APPEARANCE OF A VEHICLE BASED ON CONTENT OF THE VEHICLE

(75) Inventors: Michael N. Abernethy, Jr., Pflugerville, TX (US); Travis M. Grigsby, Austin, TX (US); Steven M. Miller, Cary, NC (US); Lisa A. Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 839 days.

(21) Appl. No.: 12/193,371

(22) Filed: Aug. 18, 2008

(65) Prior Publication Data

US 2010/0042285 A1 Feb. 18, 2010

(51) Int. Cl.
*B60Q 1/00* (2006.01)

(52) U.S. Cl. ........... 340/425.5; 340/438; 701/1; 701/36; 40/591; 296/21

(58) Field of Classification Search ................ 701/1, 36; 340/425.5, 438, 468, 485; 40/591; 296/21
See application file for complete search history.

(56) References Cited

U.S. PATENT DOCUMENTS

| | | | | |
|---|---|---|---|---|
| 4,837,551 | A * | 6/1989 | Iino | 345/7 |
| 6,029,102 | A | 2/2000 | Elsman | |
| 6,236,330 | B1 | 5/2001 | Cohen | |
| 6,289,332 | B2 | 9/2001 | Menig et al. | |
| 6,542,822 | B1 * | 4/2003 | Froeberg | 701/213 |
| 6,553,313 | B1 * | 4/2003 | Froeberg | 701/213 |
| 6,850,209 | B2 * | 2/2005 | Mankins et al. | 345/1.3 |
| 6,898,517 | B1 * | 5/2005 | Froeberg | 701/207 |
| 7,024,180 | B2 * | 4/2006 | Waters et al. | 455/414.1 |
| 7,154,383 | B2 * | 12/2006 | Berquist | 340/425.5 |
| 7,444,771 | B2 * | 11/2008 | Raccah | 40/466 |
| 7,449,998 | B1 * | 11/2008 | Au et al. | 340/468 |
| 2002/0070879 | A1 * | 6/2002 | Gazit et al. | 340/901 |
| 2002/0097193 | A1 * | 7/2002 | Powers | 345/2.3 |

(Continued)

FOREIGN PATENT DOCUMENTS

WO WO 2006069445 A1 * 7/2006

(Continued)

OTHER PUBLICATIONS

"MINI Introduces RFID-Activated Billboards", SourceForge, Inc., Slashdot, http://yro.slashdot.org/article.pl?sid=07/01/11/2021244&from=rss, 12 pages.

*Primary Examiner* — Darnell Jayne
*Assistant Examiner* — Sasha T Varghese
(74) *Attorney, Agent, or Firm* — Stephen J. Walder, Jr.; David A. Mims, Jr.

(57) ABSTRACT

A mechanism is provided for controlling an output of a vehicle mounted display based on the current cargo loading of the vehicle so as to change the appearance of the vehicle. The mechanisms may identify at least one identifier of contents of a current cargo loading of the vehicle. The at least one identifier may identify at least one product currently being transported by the vehicle. The mechanisms may further correlate the at least one identifier with display data to be rendered on the vehicle mounted display. The mechanisms may further output the display data to the vehicle mounted display such that the display data is rendered on the vehicle mounted display.

20 Claims, 5 Drawing Sheets

U.S. PATENT DOCUMENTS

| | | | | |
|---|---|---|---|---|
| 2002/0130778 | A1* | 9/2002 | Nicholson | 340/572.1 |
| 2003/0144906 | A1* | 7/2003 | Fujimoto et al. | 705/14 |
| 2004/0133319 | A1* | 7/2004 | Pillar et al. | 701/29 |
| 2004/0192351 | A1* | 9/2004 | Duncan | 455/456.3 |
| 2005/0083403 | A1* | 4/2005 | Flores et al. | 348/61 |
| 2005/0150147 | A1* | 7/2005 | Berryman | 40/590 |
| 2006/0207141 | A1* | 9/2006 | Pitt et al. | 40/590 |
| 2006/0248763 | A1 | 11/2006 | Tarabella | |
| 2006/0289637 | A1* | 12/2006 | Brice et al. | 235/385 |
| 2007/0112762 | A1* | 5/2007 | Brubaker | 707/5 |
| 2008/0010875 | A1* | 1/2008 | Kuwabara et al. | 40/424 |
| 2008/0030427 | A1 | 2/2008 | Lanham | |
| 2008/0051996 | A1* | 2/2008 | Dunning et al. | 701/211 |
| 2008/0055287 | A1* | 3/2008 | Ishikawa et al. | 345/204 |
| 2008/0211652 | A1* | 9/2008 | Cope et al. | 340/461 |
| 2008/0215415 | A1* | 9/2008 | Willms | 705/10 |
| 2009/0037273 | A1* | 2/2009 | Zhu | 705/14 |

FOREIGN PATENT DOCUMENTS

| | | | |
|---|---|---|---|
| WO | WO 2007/109541 | A2 | 9/2007 |

* cited by examiner

MODIFYING AN APPEARANCE OF A VEHICLE BASED ON CONTENT OF THE VEHICLE

BACKGROUND OF THE INVENTION

1. Field of the Invention

The present application relates generally to an improved data processing apparatus and method and more specifically to mechanisms for modifying an appearance of a vehicle based on the content of the vehicle.

2. Background of the Invention

Advertising is a large part of modern society with advertisements being presented in various media to which individuals are exposed. For example, advertisements are present on television, radio, in printed materials, on street corner kiosks, on billboards, and the like. Modem billboards, for example, have the ability to change the displayed advertisement by having a mechanical mechanism that rotates individual slats in the billboard on a periodic basis so that a different advertisement is displayed periodically. Recently, such mechanisms have further been applied to vehicles, i.e. trucks, which have smaller scale billboards integrated into the sides of the vehicle. These vehicle based billboards operate in much the same manner as their rotatable billboard cousins but are mobile in nature with rotatable billboards being able to be placed on multiple sides of the vehicle.

In addition, with the ability to manufacture larger sized electronic displays at a relatively lower cost, advertising has moved to an increased use of video display devices in public areas. For example, large scale liquid crystal display (LCD) devices, plasma display devices, light emitting diode (LED) display devices, and the like, are used to display advertisements as well as other information in public areas, such as in arenas, along roadways, on building signage, and the like. A computerized mechanism is used to control the textual/graphical output of the electronic displays and to change the textual/graphical displays in accordance with a predetermined schedule.

BRIEF SUMMARY OF THE INVENTION

In one illustrative embodiment, a method, in a data processing system, is provided for controlling an output of a vehicle mounted display. The method may comprise identifying at least one identifier of contents of a current cargo loading of the vehicle. The at least one identifier may identify at least one product currently being transported by the vehicle. The method may further comprise correlating the at least one identifier with display data to be rendered on the vehicle mounted display. Moreover, the method may comprise outputting the display data to the vehicle mounted display such that the display data is rendered on the vehicle mounted display.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE INVENTION

Figure 1:
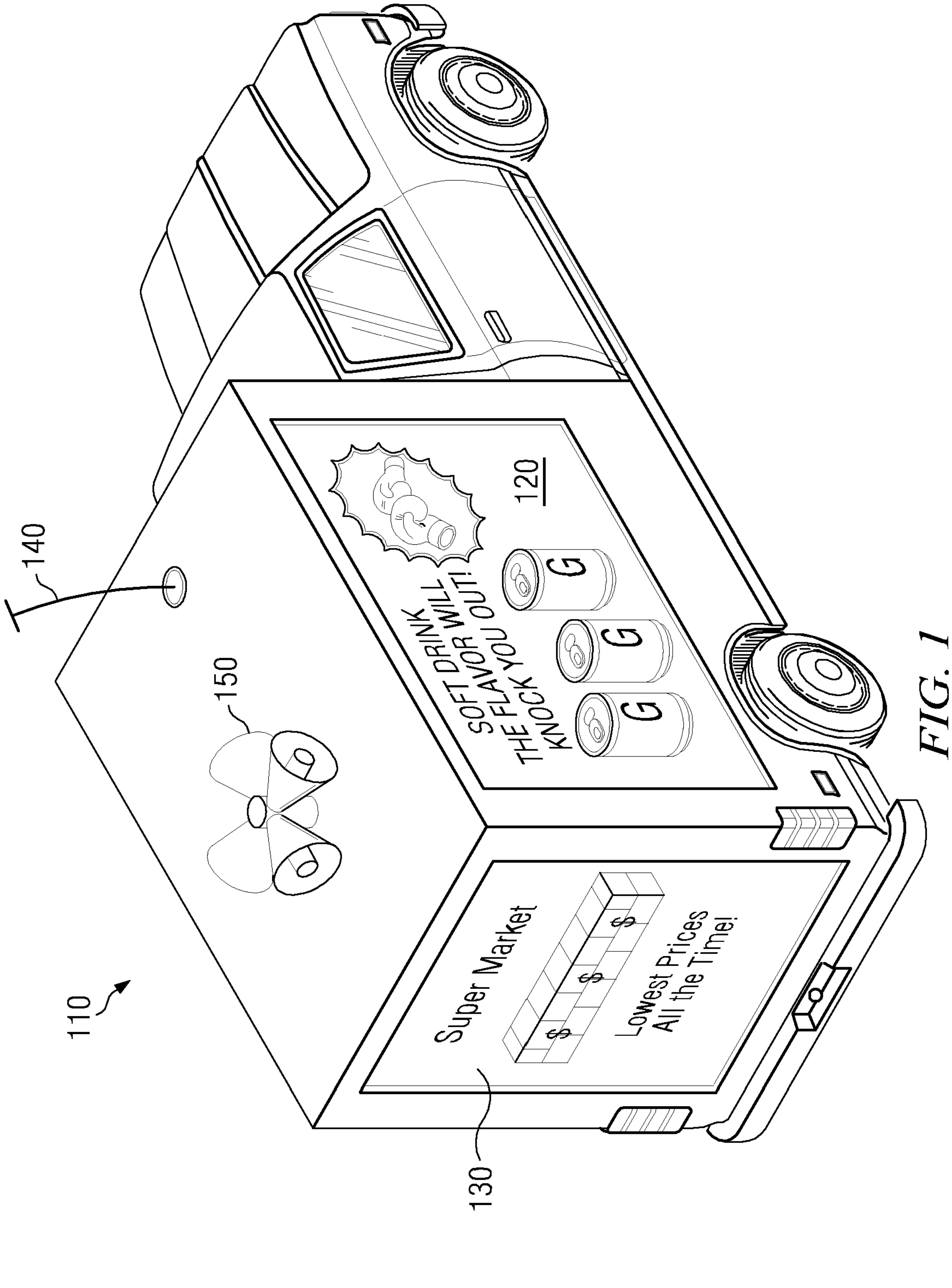
FIG. 1 is an example diagram of a vehicle with one or more display mechanisms integrated or otherwise mounted to the vehicle in accordance with one illustrative embodiment.

The illustrative embodiments provide mechanisms for modifying an appearance of a vehicle based on the content of the vehicle. More specifically, the illustrative embodiments provide control mechanisms for controlling the output of one or more electronic display devices, mechanical billboard devices, or the like, that are integrated in, affixed to, or otherwise mounted on a vehicle based on the content of the vehicle. In one illustrative embodiment, based on the characteristics of the cargo present within the vehicle, the display on the vehicle is modified to reflect these characteristics. For example, if the vehicle is currently transporting "Soft Drink," the display may be controlled so as to output a "Soft Drink" advertisement. Moreover, if the vehicle is currently transporting hazardous or flammable cargo, a corresponding output of the display may indicate the hazardous or flammable nature of the cargo. Furthermore, the output of the display, the time period between changes in the output of the display, the size of relative portions of the display, and other characteristics of the display may be controlled based on a relative determination of the amount of each type of content of the vehicle. In addition, audio output from audio output devices integrated in, mounted to, or otherwise associated with the vehicle may be controlled based on the content of the vehicle and the operation of the vehicle so as to output a desired audio message, music, or the like.

As will be appreciated by one skilled in the art, the present invention may be embodied as a system, method or computer program product. Accordingly, the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

With reference now to the figures, FIG. 1 is an example diagram of a vehicle with one or more display mechanisms integrated or otherwise mounted to the vehicle in accordance with one illustrative embodiment. As shown in FIG. 1, a vehicle 110 is provided with one or more display devices 120-130 that are either mounted to, integrated in, or otherwise coupled to the vehicle 110 such that they are made mobile due to the motion of the vehicle 110 as it is driven along a roadway or the like. In the depicted example, the vehicle 110 is shown as being a truck, but it should be appreciated that the mechanisms of the illustrative embodiments may be implemented with any vehicle capable of carrying a display device including automobiles, train cars, buses, vans, motorcycles, scooters, boats, ships, aircraft or the like. Moreover, the vehicle 110 may have many different configurations depending upon the particular vehicle chosen for the implementation. Thus, the vehicle shown in FIG. 1 should be considered as only one example and is not to be considered limiting with regard to the types or configurations of vehicles with which the mechanisms of the illustrative embodiments may be implemented.

The one or more display devices 120-130 may take many different forms. In one illustrative embodiment, the one or more display devices 120-130 are electronic display devices, such as liquid crystal display (LCD) devices, light emitting diode (LED) devices, plasma display devices, projection display devices, cathode ray tube (CRT) display devices, optical fiber screen display devices, or the like. Alternatively, the display devices 120-130 may take the form of a more mechanical mechanism, such as a rotatable billboard type mechanism, slidable sign mechanism, or the like. As mentioned above, with a rotatable billboard type mechanism, the billboard is broken into multiple slats placed adjacent to each other and which are rotatable by way of an actuator mechanism. The slats may have many different sides such that different cross sections are provided, e.g., triangular cross sections, rectangular cross sections, or the like. Thus, each side may have a different portion of a different billboard applied thereto. When the slats are rotated in synchronization, the overall image of the billboard is changed from one billboard to another. With a slidable sign mechanism, the various signs or billboards may be provided as a large scale slide that is then slid into and out of engagement with a frame such that the slide is viewable from outside of the vehicle. Other mechanical mechanisms for providing an automatically changeable billboard or sign display may be used without departing from the spirit and scope of the illustrative embodiments.

With such an electronic or mechanical display device, the actual images, text, graphics, and the like, that are output or made visible by the display device may be controlled by an on-board data processing system (not shown) carried in the vehicle 110. For electronic display devices, the data processing system may provide data to display device drivers which drive electrical signals to the electronic display device to cause the electronic display device to output an image, text, graphics, or the like, corresponding to the data. For a mechanical display device, the data processing system may send control signals to mechanical mechanisms for automatically causing the mechanical mechanisms to mechanically operate in such a manner as to change the particular billboard, sign, or the like, that is visible via the mechanical display device, e.g., control signals may cause the actuators to rotate the slats in the rotatable billboard such that a new billboard is viewable from outside the vehicle 110.

In addition, the vehicle 110 may have an audio output device 150 either integrated in, mounted to, or otherwise coupled to the vehicle 110 for use in outputting audio content. The audio output device 150 may be a loudspeaker or the like, for example. In one illustrative embodiment, the audio output device 150 may be a programmable horn of the vehicle 110. The audio output device 150, for example, may be used to play a recording of a message, a portion of music, or any other audio output. The particular audio content that is output by the audio output device 150 may be controlled by the on-board data processing system in a similar manner as the control of the display devices 120-130, as discussed hereafter.

The vehicle 110 may further comprise wireless transceiver 140 for communicating with a remotely located data processing system. The transceiver 140 is capable of receiving and transmitting data for controlling the operation of the display devices 120-130 and/or the audio output device 150 from a remote location. For example, images, text, graphics, audio recordings, music, jingles, and the like may be distributed to a fleet of vehicles, including vehicle 110, from a central location using wireless transmission mechanisms and the transceiver 140 on the vehicle 110. The transceiver 140 may be coupled to an on-board data processing system carried by the vehicle 110 which controls the operation of the display devices 120-130 and audio output device 150.

Power for operation of the data processing system, display devices 120-130, transceiver 140, audio output device 150, etc., may be obtained directly from the power system of the vehicle 110 or via a separate power system provided in or on the vehicle 110. For example, in one illustrative embodiment, solar panels may be provided on the vehicle for generating electrical power, a separate battery system may be provided, a generator, or the like. Alternatively, the battery and power systems of the vehicle 110 may be tied into the display device system of the illustrative embodiments so as to provide power to the various mechanisms of the illustrative embodiments.

For purposes of the following discussion, it will be assumed that the display devices 120-130 on the vehicle 110 are electronic display devices and that the audio output device 150 is a loudspeaker mounted to the vehicle 110. In particular, it will be assumed that the display devices 120-130 are LCD devices whose output is controlled by a data processing system carried by the vehicle 110. Such assumptions are made only for descriptive purposes and are not intended to state or imply any limitation with regard to the possible implementations of the illustrative embodiments.

The on-board data processing system may control the output of the display devices 120-130, and the audio output device 150, based on a number of different criteria. For example, the data processing system may receive data representative of the images, text, graphics, etc., that are to be output by the display devices 120-130 from a central location via the transceiver 140 and may store this data in a local store of the data processing system for use in controlling the output of the display devices 120-130. Alternatively, such images, text, graphics, etc. may be loaded into the on-board data processing system by way of a removable media, such as a CD-ROM, DVD-ROM, flash drive, portable memory device, or the like, and a removable media drive associated with the on-board data processing system. The particular images, text, graphics, etc. that are output by the display devices 120-130 at any one time may be determined based on the images, text, graphics, etc. received from the central location, or otherwise loaded into the data processing system, as well as the characteristics of the current contents of the vehicle 110, relative proportions of products within the contents of the vehicle 110, the operating status of the vehicle 110, and the like. The on-board data processing system may take all of the various inputs from the various mechanisms of the illustrative embodiments for determining the characteristics of the contents of the vehicle 110, operating status of the vehicle 110, etc., and make determinations as to what images, text, graphics, etc. are to be output on the display devices 120-130 and what audio output, if any, should be provided via the audio output device 150.

Figure 2:
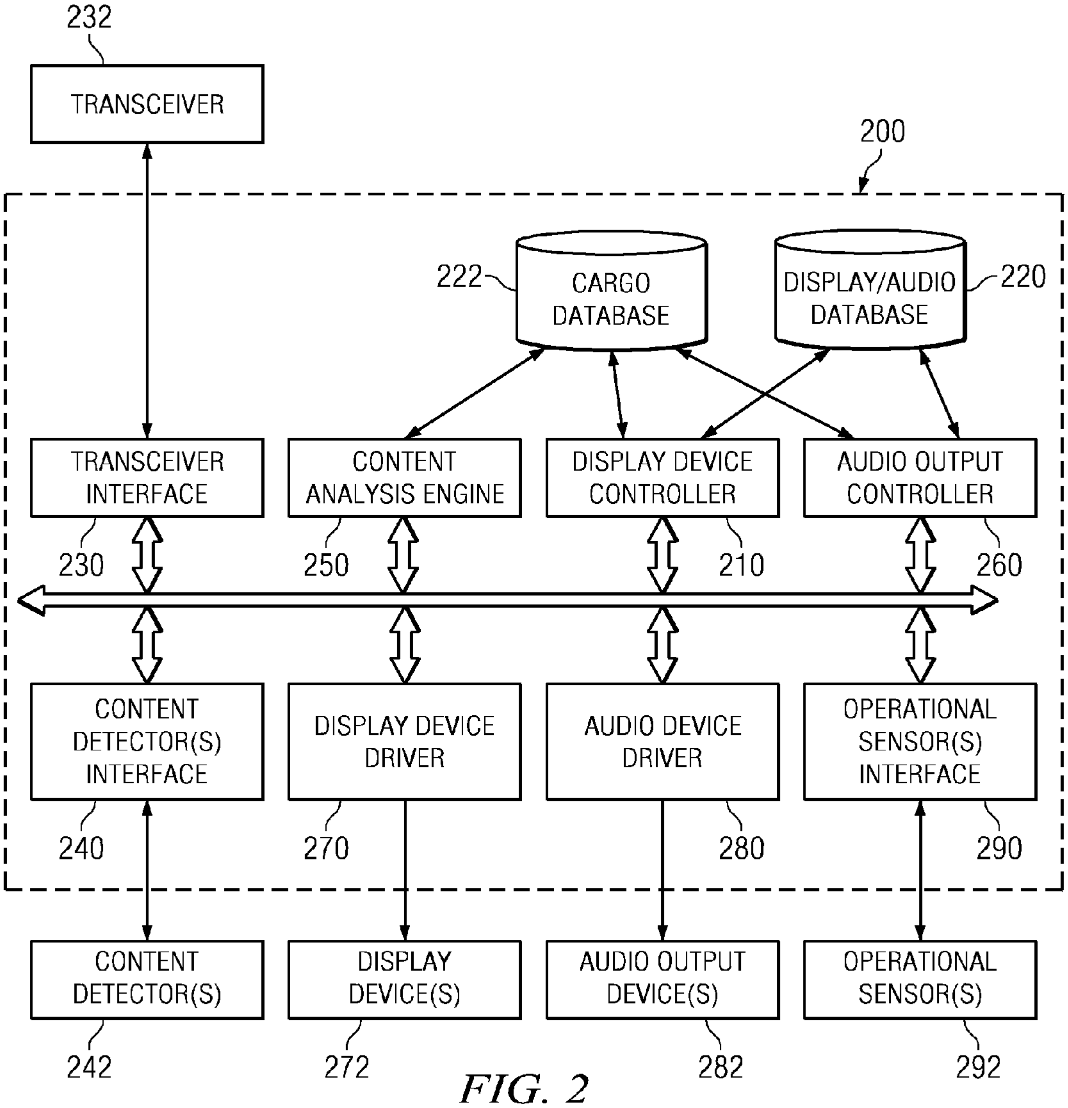
FIG. 2 is an example block diagram of a vehicle display/audio control system in accordance with one illustrative embodiment.

FIG. 2 is an example block diagram of a vehicle display/audio control system in accordance with one illustrative embodiment. The vehicle display/audio control system 200 shown in FIG. 2 may be implemented in an on-board data processing system that is carried by the vehicle 110, for example. The vehicle display/audio control system 200 may interface with input and output devices of the vehicle 110 in order to obtain data from such input devices in order to make determinations as to how to control the display/audio output. The vehicle display/audio control system 200 may control the output devices so as to generate the desired visual and/or audible output perceivable from outside of the vehicle 110.

It should be appreciated that the elements shown in FIG. 2 may be implemented in hardware, software, or any combination of hardware and software without departing from the spirit and scope of the illustrative embodiments. In one illustrative embodiment, the elements of FIG. 2 are implemented as software instructions executed by one or more data processing devices.

At the heart of the vehicle display/audio control system 200 is a display device controller 210, a content analysis engine 250, and an audio output controller 260. The content analysis engine 250 and controllers 210 and 260 comprise the logic for making determinations as to how to control the display device(s) 272 and audio output device(s) 282 so as to generate a desired visual and/or audible output perceived outside of the vehicle. The content analysis engine 250 and controllers 210 and 260 make such determinations based on inputs received from content detector(s) 242, operational sensor(s) 292, data received via the transceiver 232 and transceiver interface 230, and data stored in the display/audio database 220 and cargo database 222. The controllers 210 and 260 preferably control the output of the display device(s) 272 and audio output device(s) 282 primarily based on the detected content of the vehicle 110, e.g., the cargo being transported by the vehicle 110, as determined by analysis performed by the content analysis engine 250. The control of the display device(s) 272 and audio output device(s) 282 may then be more fine tuned based on characteristics of the cargo being transported, as determined from the cargo database 222, for example, information received via the transceiver 232, and the current operational state of the vehicle, as determined from the operational sensor(s) 292.

When contents are loaded into the vehicle 110, content detector(s) 242 detect identification information for the contents and report this information to the content analysis engine 250 via the content detector(s) interface 240. The content detector(s) 242 are preferably coupled to the vehicle display/audio control system 200 in either a wired or wireless manner for transmitting data representative of the identity of the contents. The content detector(s) 242 communicate with, or otherwise detect the presence of, identifiers associated with cargo containers loaded into the vehicle 110. In addition, when contents are unloaded from the vehicle, the content detector(s) 242 may detect the removal of the cargo containers. In this way, the content detector(s) 242 are able to provide information to the vehicle display/audio control system 200 indicative of the current contents of the vehicle 110 as determined by the identifiers of the cargo containers currently present within the vehicle 110.

The content detector(s) 242 may be mounted to, integrated in, or otherwise affixed to the vehicle 110 itself. For example, the content detector(s) 242 may be configured around an opening in the rear of the vehicle 110 through which cargo containers are typically loaded into and out of the vehicle 110. In this way, when cargo containers are loaded or removed, the content detector(s) 242 may detect this loading/removal at the opening as well as the direction of motion of the cargo container, i.e. either into or out of the vehicle 110, such that it may be determined whether particular contents are being added to or removed from the contents of the vehicle 110.

Alternatively, the content detector(s) 242 may be portable, such as with a portable scanner or the like, such that operators of the vehicle or other personnel are able to use the portable content detector(s) 242 to detect the presence of the identifiers on the cargo containers. A portable scanner may be used to scan the identifier and then, via a wired or wireless connection, transmit the identification data for the particular cargo container back to the vehicle display/audio control system 200. In such a case, it may be desirable to include buttons, touch screen functions, or the like, through which the user may control the operation of the portable content detector and provide input, for example, as to whether the particular cargo container that is being scanned is being loaded into or removed from the vehicle 110.

The content detector(s) 242 may take many different forms. For example, the content detector(s) 242 may be sensors for sensing radio frequency identifier (RFID) tags present on cargo containers, one or more bar code scanners for scanning bar codes imprinted or affixed to cargo containers, optical scanners for performing optical character reading (OCR) functions on human readable information on cargo containers, magnetic readers, camera based image analysis devices, and the like. The content detector(s) 242 may include a sophisticated weight and predictive system that is able to correlate weight and pressure point information to a prediction of the contents. The content detector(s) 242 may utilize WiFi, Bluetooth™, or other wired or wireless protocols for communication.

Moreover, content detector(s) 242 may include mechanisms for receiving data from a local user or remote system regarding content manifests, package contents, etc. For example, such manifest and package content data may be transmitted from a central location, input by a user via a local computing device, scanned in from a hard-copy print out, etc. Such manifest/package content data may provide detailed information for reference or lookup purposes so as to obtain further details from the on-board cargo database 222 or from off-board networked storage or data services. In short, any detector or sensor that is capable of identifying contents of a vehicle may be used without departing from the spirit and scope of the illustrative embodiments.

In one illustrative embodiment, the identification data encoded in the RFID tags, barcodes, or the like, is preferably associated with a data entry in the cargo database 222 such that by detecting the identifier on the cargo container, the content analysis engine 250 may correlate the identification data with information about the contents of the cargo container using the cargo database 222. The information in the cargo database 222 may be updated periodically by way of data transmissions received via the transceiver 232, or use of removable media and a media drive (not shown). Preferably, the information in the cargo database 222 identifies the contents of the cargo containers having the corresponding identifier as well as other characteristics of the contents including hazardous nature if any, flammability if any, weight, source of the contents (e.g., manufacturer, bottling company, etc.), company affiliations, related products or other related types of contents, etc. In addition, the entries in the cargo database 222 may contain pointers, links, or the like, to corresponding display/audio output data in the display/audio database 220.

The content analysis engine 250 receives data from the content detector(s) 242 via the content detector(s) interface 240 that indicates the identity of the various cargo containers currently loaded in the vehicle 110. These identities may be correlated by the content analysis engine 250 with display/audio data in the display/audio database 220 via entries in the cargo database 222. That is, the content analysis engine 250 may perform a lookup operation in the cargo database 222 based on the identifier information received from the content detector(s) 242 to thereby identify an entry corresponding to the identifier information. The entry contains characteristic information about the contents, e.g., products, corresponding to that identifier as well as pointers or links to the display/audio data corresponding to those contents. The display/audio data may be retrieved by the display device controller 210 and audio output controller 260 from the display/audio database 220 based on these pointers/links. The display device controller 210 may then determine if and when to provide the corresponding retrieved display data to the display device driver 270 for driving the display device(s) 272 to output the display data so that it may be perceived outside of the vehicle 110. That is, the display device controller 210 may determine a schedule, timing, sequence of outputs, and/or the like for controlling the images, text, graphics, etc. output on the display device(s) 272 based on the retrieved display data for each of the different types of contents detected to be present within the vehicle 110. A similar control may be performed with regard to the retrieved audio data using the audio output controller 260, the audio device driver 280, and the audio output device(s) 282.

Thus, in one illustrative embodiment, the outputs of the display device(s) 272 and audio output device(s) 282 of a vehicle are controlled purely based on the detected contents of the cargo currently loaded in the vehicle. However, the illustrative embodiments are not limited to such and further refinements to this control may be performed based on various characteristics of the contents as well as the operation of the vehicle, as discussed hereafter.

In one illustrative embodiment, as cargo containers are scanned or otherwise detected by the content detector(s) 242, the content analysis engine 250 maintains a count of the different types of cargo containers currently loaded into the vehicle 110. Thus, cargo containers having a same identifier will be accumulated into a single count for that content type. By comparing the counts for each of the content types currently loaded in the vehicle 110, a relative distribution of the current cargo loading of the vehicle may be determined. This relative distribution of the current cargo loading of the vehicle may be used to determine a relative schedule, timing, sequence of display/audio output by the display device controller 210 and/or audio output controller 260. Moreover, this relative distribution of the current cargo loading may be used as a basis for determining different characteristics of the display/audio output, such as size, placement on the display device(s) 272, and the like.

For example, assume that there are three different products currently loaded in the vehicle 110 with their presence and relative quantities within the vehicle 110 having been determined based on the content detector(s) 242 and the accumulation of counts by the content analysis engine 250. A first product, Soft Drink, represents approximately 60% of the current cargo loading of the vehicle 110. A second product, Super Market products, represents approximately 30% of the current cargo loading of the vehicle 110. A third product, Fungal Foot Powder, represents approximately 10% of the current cargo loading of the vehicle 110. The manner by which the display/audio data for these various products is output using the display device(s) 272 and audio output device(s) 282 may be customized based on this relative distribution of the current cargo loading so as to favor products representing a larger portion of the current cargo loading.

For example, since Soft Drink represents the largest portion of the current cargo loading of the vehicle 110, the display/audio data for an advertisement for Soft Drink will be given priority over display/audio data for the other products when determining the manner by which such display/audio data is to be output. This may cause the display data for the Soft Drink advertisement to be displayed on the largest display device of the display device(s) 272, to be output for a longer period of time in a sequence of advertisements for the three products, increase the frequency at which the Soft Drink advertisement is output on the display device(s) 272, increase the size of the display of the Soft Drink advertisement relative to other advertisements displayed on the display device(s) 272, may cause certain display effects to be used with regard to the Soft Drink advertisement that are not used with other advertisements in a sequence of advertisements, and the like.

Since Super Market products represent a second largest portion of the current cargo loading of the vehicle 110, the display/audio data for Super Market products may be provided a second highest priority with regard to the manner by which the display/audio data is output using the display device(s) 272 and audio output device(s) 282. Thus, for example, a Super Market advertisement may be given a second longest display time, a second highest frequency of display, a second largest size display, etc. Fungal Foot Powder would thus, be given a third priority relative to the other products.

For example, in one illustrative embodiment, since Soft Drink represents 60% of the current cargo loading, its corresponding advertisement will be displayed 60% of the time, while the Super Market products advertisement is displayed 30% of the time and the Fungal Foot Powder advertisement is displayed 10% of the time using the display device(s) 272. This apportionment of time may be made with regard to each display device individual or to all of the display device(s) 272 as a group. Thus, in this illustrative embodiment, the relative distribution of the cargo loading is used to provide a time-weighted scheduling of a sequence of display/audio data on output devices mounted to, integrated in, or otherwise affixed to the vehicle 110.

It should be appreciated that there are a plethora of different ways in which the manner by which the display/audio data is output may be customized based on the relative distribution of the current cargo loading of the vehicle. For example, the display device(s) 272 may have their displays partitioned such that the two highest priority products have their advertisements displayed, a highest priority product's advertisement may be displayed by itself on one display device while lower priority products' advertisements must share a separate display device, or the like. The variations are numerous and thus, cannot all be described in detail herein. However, it should be appreciated that the mechanism of the illustrative embodiments are intended to encompass any mechanism for customizing the output of display/audio data based on the current cargo loading of the vehicle 110.

In another illustrative embodiment, rather than using a straight relative distribution of the cargo loading, other characteristics may be used in determining the manner by which to output the display/audio data including the relative commercial value of the products, relative quality of the products, whether the products contain hazardous materials, whether the products contain flammable materials, and the like. For example, rather than providing priority in the display of advertisements to the product(s) having the highest portion of the current cargo loading, a product that has a higher relative value, yet lower overall portion of the current cargo loading, may be given a highest priority over relatively lower valued products in the current cargo loading. Moreover, the particular display data/audio data that is output to the display device(s) 272 and audio output device(s) 282 may be modified if the corresponding product contains hazardous or flammable materials. These modifications may include the addition of warning notices, contact information, and the like. The contact information that may be displayed may be obtained from the cargo database 222 entry corresponding to the product, for example.

Similar customizations may be made for audio data being output via the audio output controller 260, audio device driver 280, and audio output device(s) 282. For example, audio data being output may be customized to output a jingle, theme song, or the like, via the audio output device(s) 282 associated with particular contents of the vehicle 110 either alone or in association with a visual output on the display device(s) 272. Thus, for example, if it is determined that the contents of the vehicle are predominantly for Soft Drink, then a jingle for Soft Drink may be played by the audio output device(s) 282 a predominant amount of the time either alone or in combination with a visual advertisement for Soft Drink on the display device(s) 272.

In addition, the video and audio output may be modified based on the current operational status of the vehicle 110 as determined by input from the operational sensor(s) 292 via the operational sensor(s) interface 290. The operational sensor(s) 292 may comprise various sensors for determining a current operational status of the vehicle including a turn sensor, braking sensor, speedometer sensor, global positioning system (GPS) sensor, transmission gear sensor, etc. The inputs from these sensor(s) 292 may be provided to the display device controller 210 and/or audio output controller 260 which may then take into account the current operational status of the vehicle 110 when making determinations as to if, when, and how to output display/audio data. For example, audio output may only be generated when the vehicle 110 is determined to be relatively stationary based on the inputs from the speedometer sensor. Moreover, the display on a rear surface of the vehicle may be modified to indicate a backing up operation in response to the transmission gear sensor providing an input indicating that the vehicle has been placed in reverse operation.

In one illustrative embodiment, the display of advertisements may be automatically transitioned from one display device on the vehicle 110 to another based on the movement of the vehicle 110 as determined from the turn sensor, GPS sensor, or the like. For example, in order to maintain an advertisement being displayed in a constant direction relative to the vehicle 110 as the vehicle 110 is turning left, the advertisement currently being displayed on a right side of the vehicle 110 may be transitioned to a display device on a rear side of the vehicle 110. Similarly, an advertisement currently being displayed on the rear side of the vehicle 110 may be transitioned to a display device on the left side of the vehicle 110. In this way, the advertisement remains visible to viewers from the same direction as prior to the vehicle's turn. The rate at which the display is transitioned from one display device to another may be determined such that it closely matches the turn rate of the vehicle 110, for example, as determined from the various sensors 292.

In yet another illustrative embodiment, the sensors 292 may also include weather condition detection sensors, such as rain sensors, temperature sensors, and the like. This information may be used to select between various display/audio data established for the same product. For example, the advertiser of Soft Drink may have two different advertisements that they wish to use depending upon the particular weather conditions. For example, one advertisement may depict a person enjoying the product by a pool while another advertisement depicts two people under an umbrella sharing the product. The first advertisement would be best suited for weather conditions in which the weather is sunny and relatively higher in temperature. The second advertisement would be best suited for weather conditions in which the weather is rainy and may have relatively lower temperatures. Again, the display device controller 210 and audio output controller 260 comprise the logic for making such determinations based on the inputs received from the operational sensor(s) 292.

It should be appreciated that the above described illustrative embodiments assume that each product in the current cargo loading is sufficiently different from the other products. However, many times a vehicle 110 may have a current cargo loading that has contents all from a similar source but which may comprise different products. For example, a cargo loading of a vehicle 110 may comprise three different soft drinks all from the same bottling company but which in themselves are different products. Rather than providing a sequence of advertisements for each of the individual products, the content analysis engine 250 may, based on the information retrieved from the cargo database 222, determine that a plurality of products in the current cargo loading correspond to the same product source, i.e. the bottling company, and thus, may retrieve an advertisement or other display/audio data, such as a logo or the like, from the display/audio database 220 for the product source rather than the individual products themselves. The display/audio data for the product source may then be used to drive the display device(s) 272 and audio output device(s) 282 rather than display/audio data for the individual products. Using a real-world example, this avoids a single vehicle 110 sequencing between an advertisement for Budweiser™, Bud Light™, and Bud Ice™, and instead provides a single advertisement for "Anheuser Busch" which is the source of these beverage products.

With regard to audio output via the audio output device(s) 282, it should be appreciated that there are some conditions under which audio output is not appropriate and thus, the audio output controller 260 may determine not to output audio content. For example, the operational sensor(s) 292 may include a GPS sensor as noted above and information from this GPS sensor may identify the current location of the vehicle 110 in a map database (not shown). Based on this current location, and the information in the map database, it may be determined that the vehicle is currently being operated in an area where audio output should not be generated, e.g., a hospital zone, school zone, residential area, or the like. Moreover, other sensor input, such as a clock or the like, may be used to determine that the current time of day indicates that audio output should not be generated, e.g., audio output should not be generated before 6 am on a Saturday.

As mentioned above, in some instances the characteristics of the contents of the vehicle 110 may require that certain information be displayed or audibly output in order to inform nearby persons of potential dangers associated with the contents. For example, some contents may be hazardous or flammable. Standard notifications of such contents are generally known in the art as being physical signs painted on or affixed to the vehicle such that the sign is not dynamically able to be updated. A similar notification may be provided by the mechanisms of the illustrative embodiments based on the identification of the contents of the vehicle in a dynamic manner.

Figure 3:
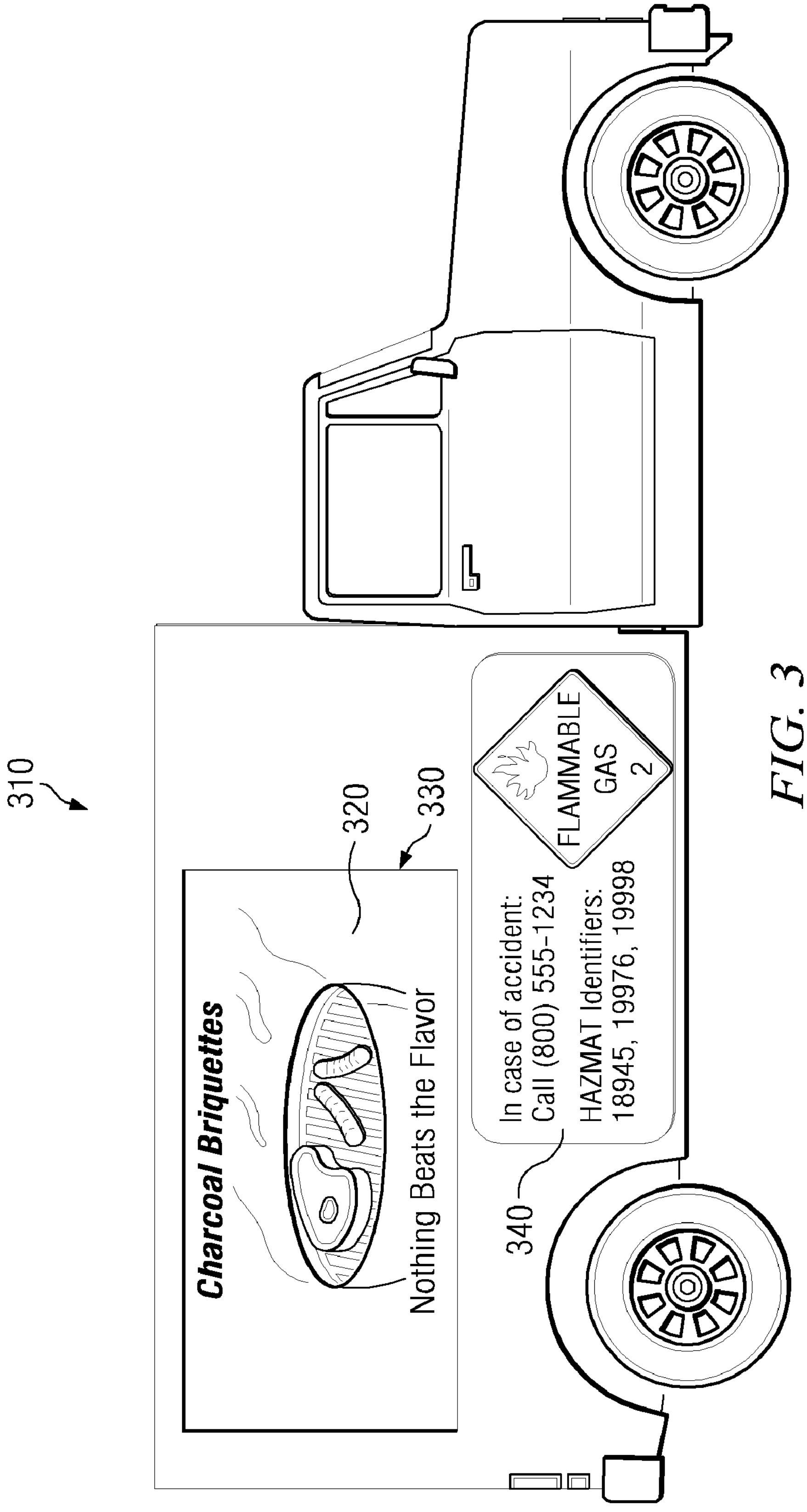
FIG. 3 is an example diagram of a vehicle with one or more display mechanisms in which warning messages/images are displayed based on the contents of the vehicle in accordance with one illustrative embodiment.

FIG. 3 is an example diagram of a vehicle with one or more display mechanisms in which warning messages/images are displayed based on the contents of the vehicle in accordance with one illustrative embodiment. As shown in FIG. 3, in addition to, or in replacement of, the display data 320 for a product in the current cargo loading of the vehicle 310, the display device 330 further outputs warning notification data 340 based on the determined characteristics of the current cargo loading. In the depicted example, the vehicle 310 is currently transporting charcoal lighter fluid which is flammable. Thus, a display of a standard warning sign indicating flammable contents is superimposed on a portion of the display data 320. The warning notification data 340 may further include contact information as well as hazardous materials identifiers. Other similar warning notifications may be provided for other types of cargo contents including non-flammable gases, corrosive materials, and other hazardous materials.

In a further illustrative embodiment, the standard warning sign may be altered based on the current operating condition of the vehicle as determined by the operational sensor(s) 292. For example, different warning signs may be displayed depending upon whether the vehicle is in motion or not or whether the vehicle is near a location where the contents of the vehicle, or the location, pose a threat, e.g., flammable liquids being transported in the vehicle with the vehicle being parked near a gas station. Moreover, different warning signs may be displayed based on whether the vehicle is determined to be near other vehicles, when occupied by a driver or passenger, or the like. Basically, any operational or environmental condition that may be sensed by operational sensor(s) 292 may be used to customize the warning sign or message being displayed.

Figure 4:
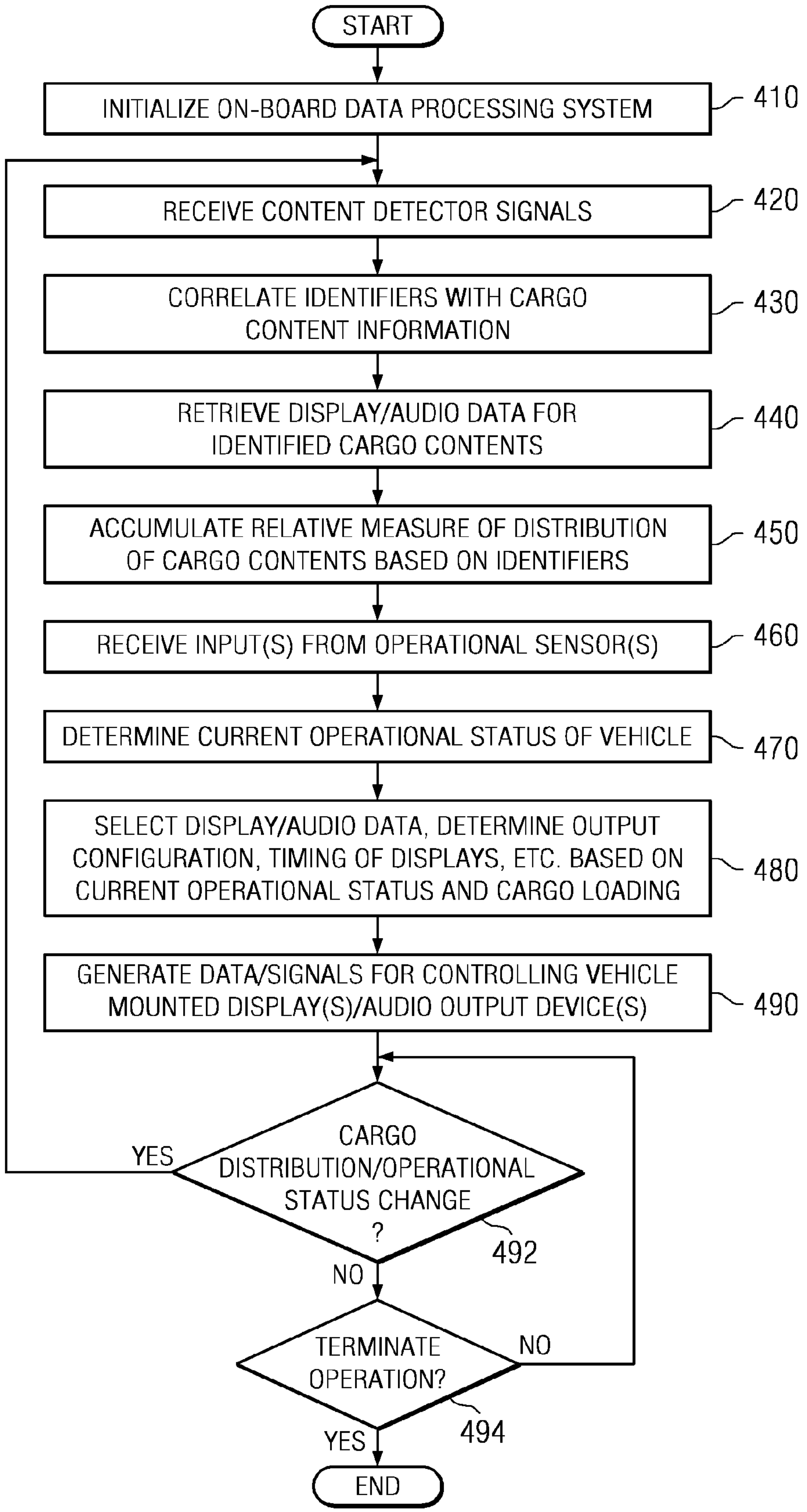
FIG. 4 is a flowchart outlining an example operation for controlling a vehicle display based on contents of the vehicle in accordance with one illustrative embodiment.

FIG. 4 is a flowchart outlining an example operation for controlling a vehicle display based on contents of the vehicle in accordance with one illustrative embodiment. The operation outlined in FIG. 4 may be performed, for example, by the on-board data processing system using the various operational elements shown in FIG. 2, for example.

As shown in FIG. 4, the operation starts with an initialization of the on-board data processing system (step 410). This initialization may be performed, for example, when the ignition of the vehicle is first turned on, in response to a user initiating the initialization operation, or the like. The on-board data processing system receives content detector signals informing the on-board data processing system of the identifiers of cargo contents being added to, or removed from the vehicle (step 420). The on-board data processing system correlates these identifiers with cargo content information (step 430) and retrieves corresponding display/audio data for the cargo contents (step 440). The on-board data processing system accumulates a relative measure of the distribution of the cargo based on the identifies of the cargo content being added to or removed from the vehicle (step 450). In addition, the on-board data processing system receives inputs from operational sensor(s) indicating the current operational status of the vehicle (step 460).

The on-board data processing system determines a current operational status of the vehicle based on the operational sensor inputs (step 470). The on-board data processing system then selects display/audio data, determines a configuration of the displayed images, text, graphics (i.e., the displays), a timing of the displays, and other display/audio output configuration information based on the current operational status of the vehicle and the determined distribution of cargo contents (step 480). The on-board data processing system then generates data/signals that are output to the vehicle mounted display device(s) and audio output device(s) to generate the desired displays and audio output (step 490).

A determination is made as to whether the cargo distribution or operational status of the vehicle has changed (step 492). If so, the operation returns to step 420. If not, the operation returns to step 490. A determination is made as to whether operation of the system is to be discontinued, such as in response to the turning off of the vehicle, for example (step 494). If so, the operation terminates. Otherwise, the operation returns to step 492.

As mentioned above, the control of the display device(s) and/or audio output device(s) is performed by way of an on-board data processing system. This on-board data processing system may have many different configurations depending upon the particular implementation but in essence comprises at least one processor and a memory coupled to the at least one processor. The memory may store and provide instructions for execution by the at least one processor so as to effect the operation of the mechanisms of the illustrative embodiments. In order to provide an example of one type of data processing system configuration which may be used to implement the various mechanisms of the illustrative embodiments, FIG. 5 is provided hereafter.

Figure 5:
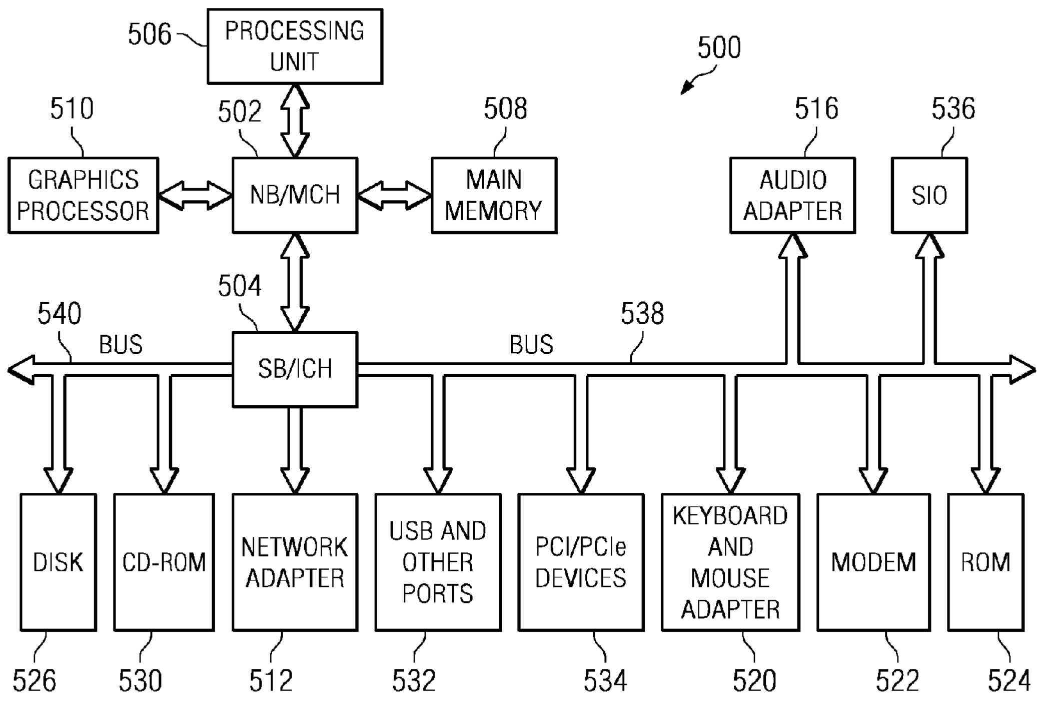
FIG. 5 is an example block diagram of a data processing system in which aspects of the illustrative embodiments may be implemented.

FIG. 5 is an example block diagram of a data processing system in which aspects of the illustrative embodiments may be implemented. Data processing system 500 is an example of a computer in which computer usable code or instructions implementing the processes for illustrative embodiments of the present invention may be located. In the depicted example, data processing system 500 employs a hub architecture including north bridge and memory controller hub (NB/MCH) 502 and south bridge and input/output (I/O) controller hub (SB/ICH) 504. Processing unit 506, main memory 508, and graphics processor 510 are connected to NB/MCH 502. Graphics processor 510 may be connected to NB/MCH 502 through an accelerated graphics port (AGP).

In the depicted example, local area network (LAN) adapter 512 connects to SB/ICH 504 and may be used to couple the data processing system 500 to a data network when possible. Audio adapter 516, keyboard and mouse adapter 520, modem 522, read only memory (ROM) 524, hard disk drive (HDD) 526, CD-ROM drive 530, universal serial bus (USB) ports and other communication ports 532, and PCI/PCIe devices 534 connect to SB/ICH 504 through bus 538 and bus 540. PCI/PCIe devices may include, for example, Ethernet adapters, add-in cards, and PC cards for notebook computers. PCI uses a card bus controller, while PCIe does not. ROM 524 may be, for example, a flash basic input/output system (BIOS).

HDD 526 and CD-ROM drive 530 connect to SB/ICH 204 through bus 540. HDD 526 and CD-ROM drive 530 may use, for example, an integrated drive electronics (IDE) or serial advanced technology attachment (SATA) interface. Super I/O (SIO) device 536 may be connected to SB/ICH 204.

An operating system runs on processing unit 506. The operating system coordinates and provides control of various components within the data processing system 500 in FIG. 5. The operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 500 (Java is a trademark of Sun Microsystems, Inc. in the United States, other countries, or both).

Moreover, the data processing system 500 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 500 may be a symmetric multiprocessor (SMP) system including a plurality of processors in processing unit 506. Alternatively, a single processor system may be employed.

Instructions for the operating system, the object-oriented programming system, and applications or programs are located on storage devices, such as HDD 526, and may be loaded into main memory 508 for execution by processing unit 506. The processes for illustrative embodiments of the present invention may be performed by processing unit 506 using computer usable program code, which may be located in a memory such as, for example, main memory 508, ROM 524, or in one or more peripheral devices 526 and 530, for example.

A bus system, such as bus 538 or bus 540 as shown in FIG. 5, may be comprised of one or more buses. Of course, the bus system may be implemented using any type of communication fabric or architecture that provides for a transfer of data between different components or devices attached to the fabric or architecture. A communication unit, such as modem 522 or network adapter 512 of FIG. 5, may include one or more devices used to transmit and receive data. A memory may be, for example, main memory 508, ROM 524, or a cache such as found in NB/MCH 502 in FIG. 5.

Those of ordinary skill in the art will appreciate that the hardware in FIG. 5 may vary depending on the implementation. Other internal hardware or peripheral devices, such as flash memory, equivalent non-volatile memory, or optical disk drives and the like, may be used in addition to or in place of the hardware depicted in FIG. 5. Also, the processes of the illustrative embodiments may be applied to a multiprocessor data processing system, other than the SMP system mentioned previously, without departing from the spirit and scope of the present invention. In some illustrative examples, data processing system 500 may be a portable computing device which is configured with flash memory to provide non-volatile memory for storing operating system files and/or user-generated data, for example. Essentially, data processing system 500 may be any known or later developed data processing system without architectural limitation.

Thus, the illustrative embodiments provide mechanisms for controlling the output of vehicle mounted or integrated display devices and audio output devices based on the current cargo loading of the vehicle. The illustrative embodiments allow the displays/audio output to be customized based on the relative characteristics of the contents of the cargo currently being transported by the vehicle. In this way, the output of advertisements, signage, and the like, on the sides of the vehicle as well as audio output messages, music, jingles, etc. may be customized to the particular contents of the vehicle. Thus, the appearance of a vehicle may be automatically modified as the current cargo loading of the vehicle changes.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, of controlling an output of a vehicle mounted display, comprising:

identifying at least one identifier of contents of a current cargo loading of the vehicle, wherein the at least one identifier identifies at least one product currently being transported by the vehicle;

correlating the at least one identifier with display data to be rendered on the vehicle mounted display; and outputting the display data to the vehicle mounted display such that the display data is rendered on the vehicle mounted display, wherein:

the display data is stored in a storage device coupled to the data processing system, the storage device stores display data, associated with corresponding identifiers of products associated with the display data, for a plurality of different types of products that are part of the contents of the vehicle, and the at least one identifier is correlated with display data by finding a matching identifier in the storage device to the at least one identifier and retrieving display data corresponding to the matching identifier.

2. The method of claim 1, further comprising:

correlating the at least one identifier with audio output data to be output by a vehicle mounted audio output device; and outputting the audio output data to the vehicle mounted audio output device such that the audio output data is output by the vehicle mounted audio output device.

3. The method of claim 2, further comprising:

determining if an operational state of the vehicle precludes output of the audio output data; and inhibiting output of the audio output data by the vehicle mounted audio output device if the operational state of the vehicle precludes output of the audio output data.

4. The method of claim 1, wherein identifying at least one identifier of contents of the current cargo loading comprises scanning one or more containers in the vehicle for identification information using a detector device and providing the at least one identifier detected by the detector device to the data processing system.

5. The method of claim 4, wherein the detector device is one of a portable detector device or a vehicle mounted detector device.

6. The method of claim 1, wherein the vehicle mounted display is one of an electronic display device or a mechanical display device.

7. The method of claim 1, wherein the display data is provided to the data processing system from a remotely located computing system via wireless transmission and a wireless receiver coupled to the data processing system and the vehicle.

8. The method of claim 1, wherein the data processing system is an on-board data processing system provided in the vehicle.

9. The method of claim 1, wherein identifying at least one identifier of contents of a current cargo loading of the vehicle comprises determining a relative measure of the plurality of different types of products within the contents of the current cargo loading of the vehicle based on the detected at least one identifier, and wherein outputting the display data to the vehicle mounted display comprises controlling at least one characteristic of the output of the display data based on the relative measure of the plurality of different types of products within the contents of the current cargo loading of the vehicle.

10. The method of claim 9, wherein determining a relative measure of the plurality of different types of products within the contents of the current cargo loading of the vehicle comprises at least one of determining an amount of each product within the contents of the current cargo loading, determining a relative quality of each product within the contents of the current cargo loading, or determining a price of each product within the contents of the current cargo loading.

11. The method of claim 9, wherein determining a relative measure of the plurality of different types of products within the contents of the current cargo loading of the vehicle comprises accumulating a count for each product in the contents as each identifier in the at least one identifier is detected by a detector and determining a percentage of the contents of the current cargo loading associated with each product of the plurality of different types of products based on the accumulated counts for each product

12. The method of claim 9, wherein determining a relative measure of the plurality of different types of products within the contents of the current cargo loading of the vehicle further comprises:

detecting an identifier of a product that is removed from the current cargo loading of the vehicle; and updating the relative measure of the plurality of different types of products to reflect the removal of the product from the current cargo loading of the vehicle.

13. The method of claim 9, wherein controlling at least one characteristic of the output of the display data based on the relative measure comprises at least one of:

controlling a timing between output of sequential portions of the display data based on the relative measure;

controlling a size of a display of a portion of the display data based on the relative measure;

controlling a position of the display of the portion of the display data based on the relative measure; or controlling which of a plurality of vehicle mounted display devices displays the portion of the display data based on the relative measure.

14. The method of claim 1, further comprising:

receiving at least one input from at least one operational sensor of the vehicle, wherein the at least one operational sensor senses a current operational state of the vehicle; and modifying the output of the display data based on the current operational state of the vehicle as determined from the at least one input.

15. The method of claim 14, wherein modifying the output of the display data based on the current operational state of the vehicle comprises selecting an alternative display data based on a current weather condition in which the vehicle is operating as determined based on the at least one input from the at least one operational sensor of the vehicle.

16. A method, in a data processing system, of controlling an output of a vehicle mounted display, comprising:

identifying at least one identifier of contents of a current cargo loading of the vehicle, wherein the at least one identifier identifies at least one product currently being transported by the vehicle;

correlating the at least one identifier with display data to be rendered on the vehicle mounted display; and outputting the display data to the vehicle mounted display such that the display data is rendered on the vehicle mounted display, wherein identifying at least one identifier of contents of a current cargo loading of the vehicle further comprises determining at least one characteristic of at least one product in the contents of the current cargo loading based on the at least one identifier and product information stored in association with the data processing system, and wherein outputting the display data further comprises modifying the output of the display data based on the determined at least one characteristic of the at least one product.

17. The method of claim 16, wherein modifying the output of the display data based on the determined at least one characteristic includes modifying the output of the display data to include a warning message based on the at least one characteristic.

18. A method, in a data processing system, of controlling an output of a vehicle mounted display, comprising:

identifying at least one identifier of contents of a current cargo loading of the vehicle, wherein the at least one identifier identifies at least one product currently being transported by the vehicle:, correlating the at least one identifier with display data to be rendered on the vehicle mounted display;

outputting the display data to the vehicle mounted display such that the display data is rendered on the vehicle mounted display:

receiving at least one input from at least one operational sensor of the vehicle, wherein the at least one operational sensor senses a current operational state of the vehicle; and modifying the output of the display data based on the current operational state of the vehicle as determined from the at least one input, wherein modifying the output of the display data based on the current operational state of the vehicle comprises controlling a transition of the display data from a first vehicle mounted display device of the vehicle to a second vehicle mounted display device of the vehicle based on a turning direction and turning rate of the vehicle as detected by the at least one operational sensor and determined based on the at least one input from the at least one operational sensor of the vehicle.

19. A computer program product comprising a computer recordable medium having a computer readable program recorded thereon, wherein the computer readable program, when executed on a computing device, causes the computing device to:

identify at least one identifier of contents of a current cargo loading of a vehicle, wherein the at least one identifier identifies at least one product currently being transported by the vehicle;

correlate the at least one identifier with display data to be rendered on a vehicle mounted display; and output the display data to the vehicle mounted display such that the display data is rendered on the vehicle mounted display, wherein:

the display data is stored in a storage device coupled to the data processing system, the storage device stores display data, associated with corresponding identifiers of products associated with the display data, for a plurality of different types of products that are part of the contents of the vehicle, and the at least one identifier is correlated with display data by finding a matching identifier in the storage device to the at least one identifier and retrieving display data corresponding to the matching identifier.

20. An apparatus, comprising:

a processor; and a memory coupled to the processor, wherein the memory comprises instructions which, when executed by the processor, cause the processor to:

identify at least one identifier of contents of a current cargo loading of a vehicle, wherein the at least one identifier identifies at least one product currently being transported by the vehicle;

correlate the at least one identifier with display data to be rendered on a vehicle mounted display; and output the display data to the vehicle mounted display such that the display data is rendered on the vehicle mounted display, wherein:

the display data is stored in a storage device coupled to the data processing system, the storage device stores display data, associated with corresponding identifiers of products associated with the display data, for a plurality of different types of products that are part of the contents of the vehicle, and the at least one identifier is correlated with display data by finding a matching identifier in the storage device to the at least one identifier and retrieving display data corresponding to the matching identifier.

* * * * *